United States Patent
McMurtrey

(10) Patent No.: US 7,379,256 B2
(45) Date of Patent: May 27, 2008

(54) SYSTEM AND METHOD OF REWRITING DATA TRACKS

(75) Inventor: David McMurtrey, Loveland, CO (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 11/529,763

(22) Filed: Sep. 28, 2006

(65) Prior Publication Data

US 2007/0076315 A1    Apr. 5, 2007

Related U.S. Application Data

(60) Provisional application No. 60/722,830, filed on Sep. 30, 2005.

(51) Int. Cl.
*G11B 5/09* (2006.01)
*G11B 21/02* (2006.01)

(52) U.S. Cl. .......................................... 360/53; 360/75

(58) Field of Classification Search ..................... None
See application file for complete search history.

(56) References Cited

U.S. PATENT DOCUMENTS

| | | | | |
|---|---|---|---|---|
| 5,333,140 | A | * | 7/1994 | Moraru et al. ............... 714/719 |
| 5,406,426 | A | | 4/1995 | Culley et al. .................. 360/51 |
| 6,392,831 | B1 | * | 5/2002 | Yeo et al. ....................... 360/53 |
| 6,785,073 | B2 | | 8/2004 | Min et al. ....................... 360/31 |
| 6,925,580 | B2 | | 8/2005 | Hoskins .......................... 714/8 |
| 7,012,775 | B2 | * | 3/2006 | Suzuki et al. .................. 360/75 |
| 7,050,260 | B1 | | 5/2006 | Tung et al. .................... 360/75 |
| 2004/0001415 | A1 | | 1/2004 | Formato et al. .............. 369/69 |

* cited by examiner

*Primary Examiner*—K. Wong
(74) *Attorney, Agent, or Firm*—Kirk A. Cesari; Westman, Champlin & Kelly, P.A.

(57) ABSTRACT

The present disclosure is directed to systems and methods of rewriting defective tracks in a data storage device. In a particular embodiment, the method includes writing a servo pattern on a data storage surface having tracks, detecting a defective track, and rewriting information on the defective track. The method also includes failing a test when a number of defective tracks is greater than a threshold. The method also includes rewriting servo bursts.

17 Claims, 6 Drawing Sheets

SYSTEM AND METHOD OF REWRITING DATA TRACKS

RELATED APPLICATIONS

The present application claims benefit under 35 U.S.C. § 119(e) of U.S. Provisional Application Ser. No. 60/722,830 filed Sep. 30, 2005, the contents of which are hereby incorporated by reference in its entirety.

FIELD OF THE DISCLOSURE

The present disclosure relates generally to rewriting data tracks on a data storage surface.

BACKGROUND

Disc drives are data storage devices that store digital data in magnetic form on a rotating storage medium called a disc. Each surface of a disc is divided into several thousand tracks that form tightly-packed concentric circles. Each track is further broken down into sectors.

Typically, disc drives contain unusable sectors when they are manufactured. These unusable sectors are called defective sectors. When defective sectors are discovered, each of the memory locations corresponding to the defective sectors are mapped to a good sector in another part of the data storage area of the disc. For this mapping purpose, spare sectors are reserved in a disc drive as substitutes for later detected defective sectors.

When a track with an unacceptable number of defects is found, rather than mapping individual sectors to spare sectors, the track is removed from a usable list of good tracks. These unusable tracks are called defective tracks. When a defective track is discovered, the memory locations corresponding to the defective track are mapped to a good track in another part of the data storage area of the disc. For this mapping purpose, spare tracks are reserved in a disc drive as substitutes for later detected defective tracks.

If there is an unacceptable number of defective tracks, the disc drive will fail because there are not enough adequate spare tracks that can be mapped. In addition, there is a yield loss of data storage capacity due to defective tracks. Thus, there is a need for a system and method for managing defective tracks.

DETAILED DESCRIPTION OF THE DRAWINGS

In the following detailed description of the embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

The present disclosure is directed to a method of writing rewriting data tracks that includes writing a servo pattern on a data storage surface having tracks. The method also includes detecting a defective track. The method also includes rewriting information on the defective track.

In another embodiment, the disclosure is directed to a device that includes a data storage surface having at least one data track with a servo pattern. The device also includes a head for writing data on the at least one data track. Further, the device includes a controller operably programmed to detect a defective data track. The controller is also programmed to rewrite the servo pattern on the defective track.

In another embodiment, the disclosure is to a test system that includes a writer for writing servo patterns on data tracks of a data storage surface. The test system also includes a controller operably programmed to detect a defective track. The controller is also programmed to determine a test failure when a number of defective tracks is greater than a threshold. The controller is further programmed to rewrite a servo pattern on the defective track.

Figure 1:
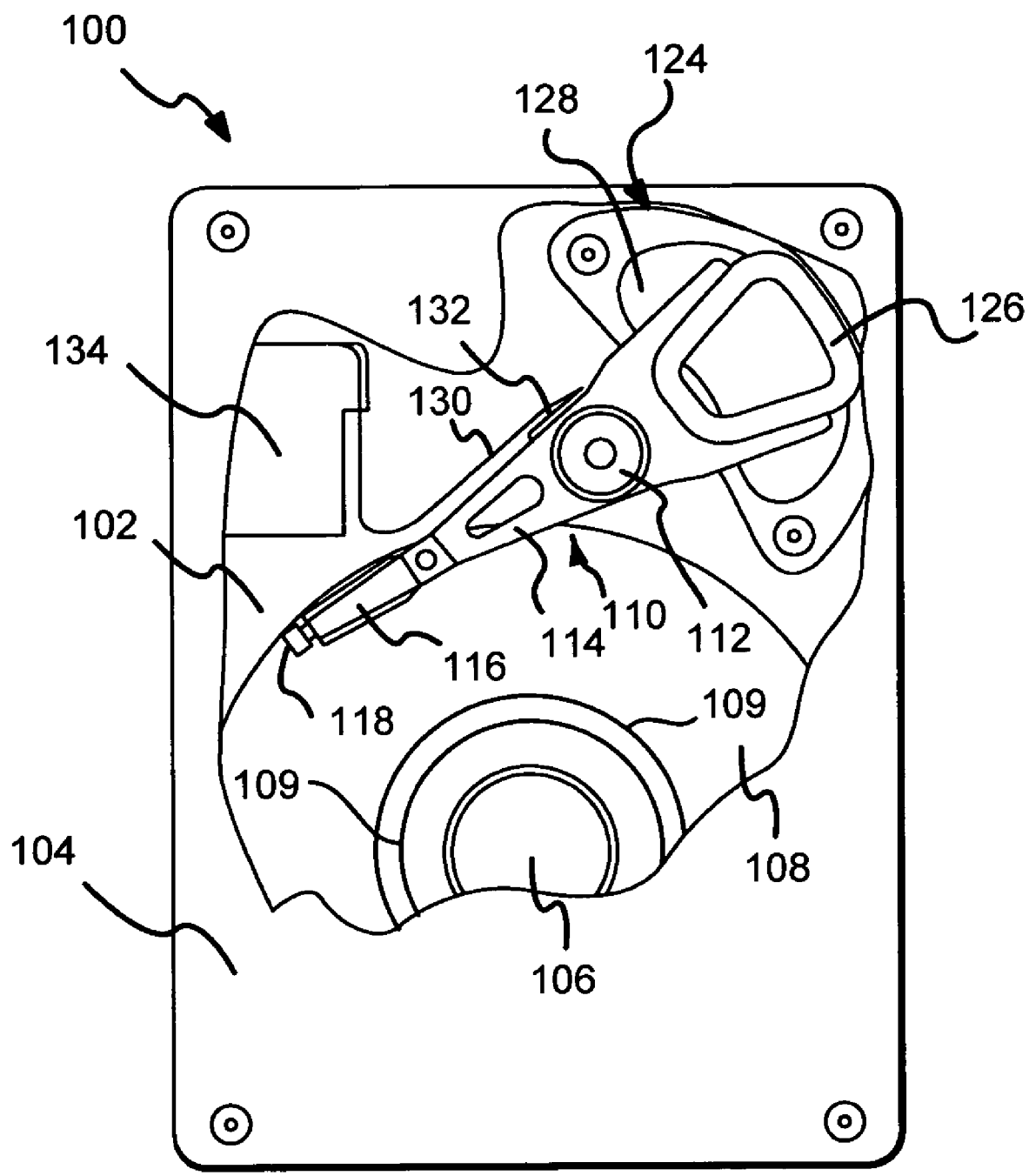
FIG. 1 is a cutaway view of an illustrative embodiment of a disc drive.

Referring to FIG. 1, in a particular embodiment, a disc drive 100 includes a base 102 to which various components of the disc drive 100 are mounted. A top cover 104, shown partially cut away, cooperates with the base 102 to form an internal, sealed environment for the disc drive. The components of the disc drive 100 include a spindle motor 106, which rotates one or more discs 108. Information is written to and read from tracks on the discs 108 through the use of an actuator assembly 110 that rotate about a bearing shaft assembly 112 positioned adjacent the discs 108. The actuator assembly 110 includes one or more actuator arms 114 that extend toward the discs 108, with one or more flexures 116 extending from the actuator arms 114. Mounted at the distal end of each of the flexures 116 is a head 118 including an air bearing slider (not shown) that enables the head 118 to fly in close proximity above the corresponding surface of the associated disc 108.

The track position of the heads 118 is controlled, during a seek operation, through the use of a voice coil motor (VCM) 124 that typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

A flex assembly 130 provides requisite electrical connection paths for the actuator assembly 110 while allowing pivotal movement of the actuator assembly 110 during operation. The flex assembly 130 can include a printed circuit board 132 to which head wires (not shown) are connected. The head wires may be routed along the actuator arms 114 and the flexures 116 to the heads 118. The printed circuit board 132 may include circuitry for controlling the write currents applied to the heads 118 during a write operation and a preamplifier (not shown) for amplifying read signals generated by the heads 118 during a read operation. The flex assembly 130 terminates at a flex bracket 134 for communication through the base 102 to a disc drive printed circuit board (not shown) mounted to the disc drive 100.

As shown in FIG. 1, a plurality of nominally circular, concentric tracks 109 are located on the surface of the discs 108. Each track 109 includes a number of servo fields that are interspersed with user data fields along the track 109. The user data fields are used to store user data, and the servo fields are used to store servo information used by a disc drive servo system to control the position of the heads 118.

Figure 2:
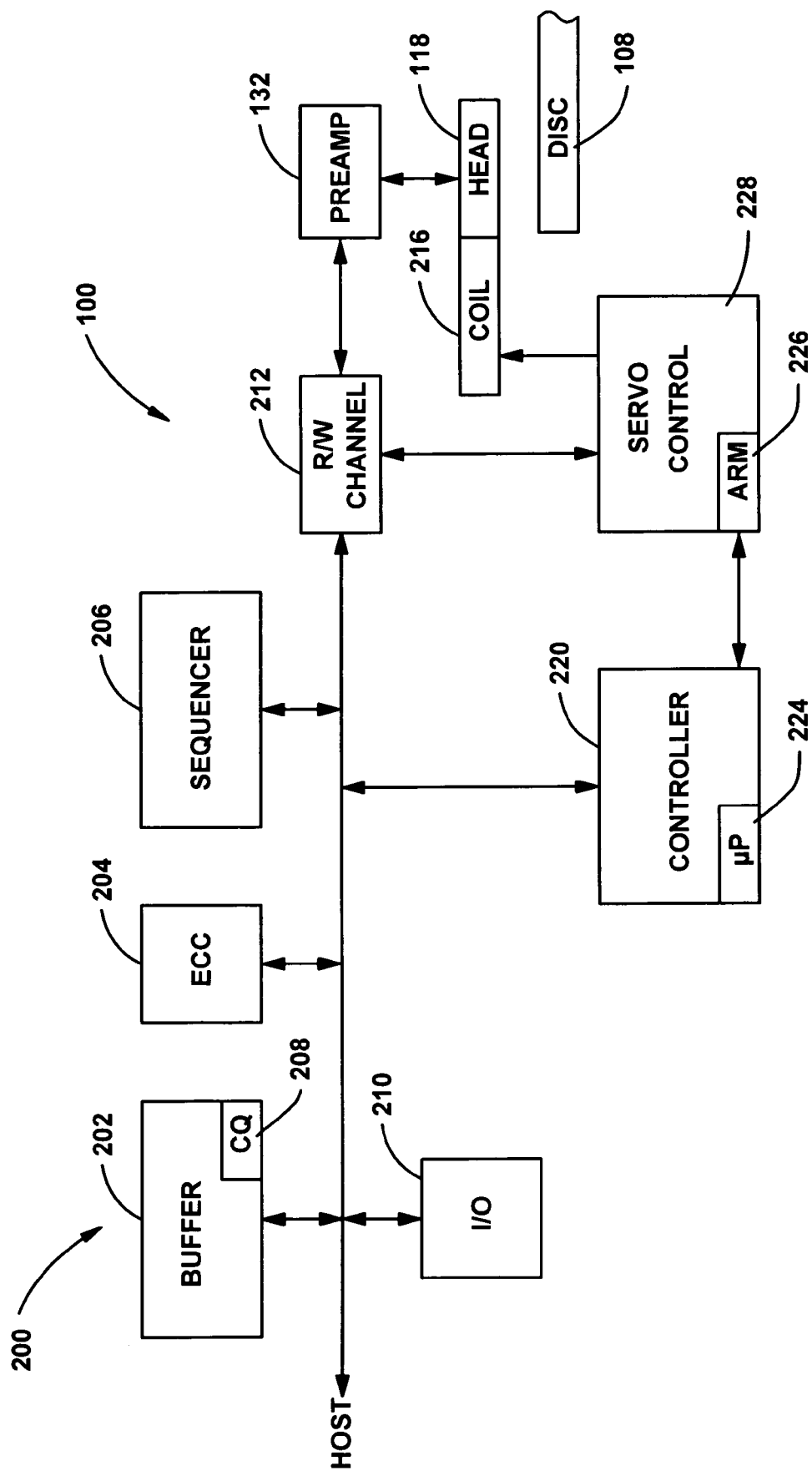
FIG. 2 is a block diagram of an illustrative embodiment of a disc drive system.

FIG. 2 provides a functional block diagram of the disc drive 100. A hardware/firmware based interface circuit 200 communicates with a host device (such as a personal computer, not shown) and directs overall disc drive operation. The interface circuit 200 includes a programmable controller 220 with associated memory 224, a buffer 202, an error correction code (ECC) block 204, a sequencer 206, and an input/output (I/O) control block 210.

The buffer 202 temporarily stores user data during read and write operations, and includes a command queue (CQ) 208 where multiple pending access operations are temporarily stored pending execution. The ECC block 204 applies on-the-fly error detection and correction to retrieved data. The sequencer 206 asserts read and write gates to direct the reading and writing of data. The I/O block 210 serves as an interface with the host device.

FIG. 2 further shows the disc drive 100 to include a read/write (R/W) channel 212 which encodes data during write operations and reconstructs user data retrieved from the discs 108 during read operations. A preamplifier/driver circuit (preamp) 132 applies write currents to the heads 118 and provides pre-amplification of readback signals.

A servo control circuit 228 uses servo data to provide the appropriate current to the coil 216 to position the heads 118. The controller 220 communicates with a processor 226 to move the heads 118 to the desired locations on the disc 108 during execution of the various pending commands in the command queue 208.

Figure 3:
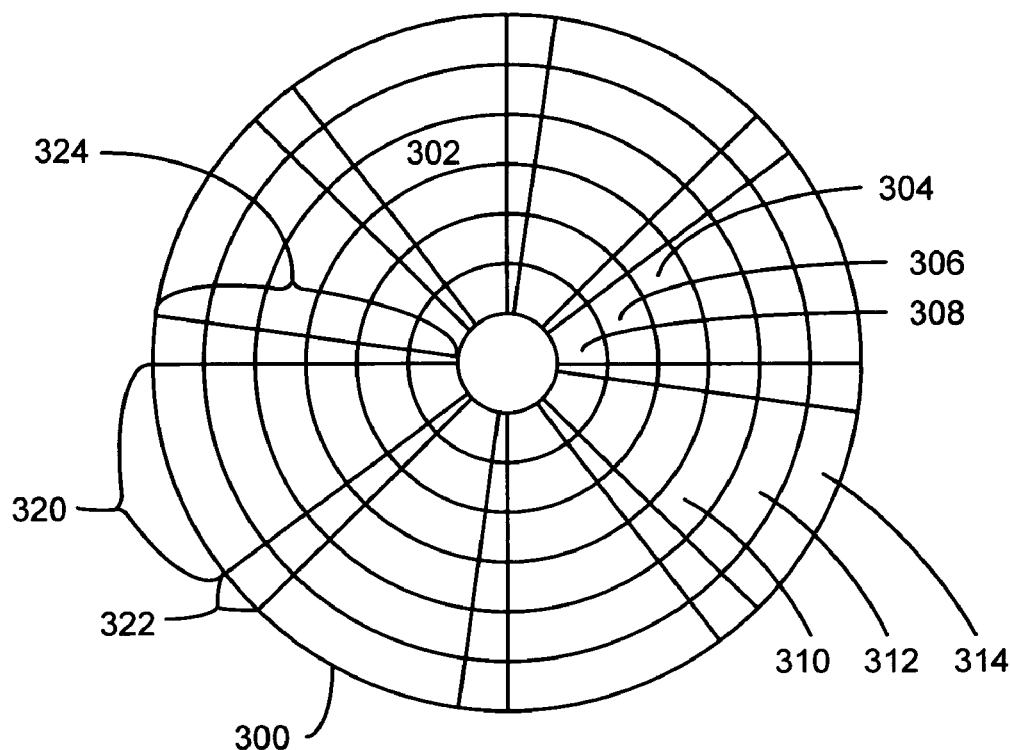
FIG. 3 is a general diagram of an illustrative embodiment of data storage elements in a disc drive.

FIG. 3 is a diagrammatic representation of a simplified top view of a disc 300 having a surface 302 which has been formatted to be used in conjunction with an embedded servo system. As illustrated in FIG. 3, the disc 300 includes a plurality of concentric tracks 304, 306, 308, 310, 312, and 314 for storing data on the surface 302. Although FIG. 3 only shows a relatively small number of tracks (i.e., 6) for ease of illustration, it should be appreciated that typically tens of thousands of tracks are included on the surface 302 of a disc 300.

Each track 304, 306, 308, 310, 312, and 314 is divided into a plurality of data sectors 320 and a plurality of servo sectors 322. The servo sectors 322 in each track are radially aligned with servo sectors 322 in the other tracks, thereby forming servo wedges 324 which extend radially across the disc 300.

During the disk drive manufacturing process, a servo track writer (STW) is used to write the radially-aligned servo information which forms servo wedges 324. A STW is capable of writing servo information on a disc surface with a high degree of positional accuracy. Alternatively, servo patterns can be written to a disc using other techniques, such as writing servo patterns with a media writer.

Figure 4:
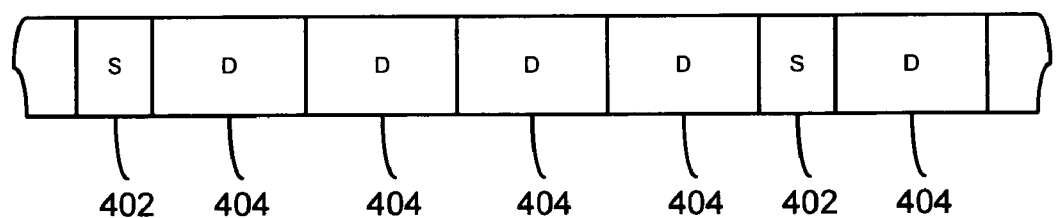
FIG. 4 is a general diagram of an illustrative embodiment of a portion of a data track on a data storage disc.

FIG. 4 represents a portion of a data track 109, illustrating the general manner in which both servo data fields 402 and user data fields 404 are arranged on each of the disc surfaces. One or more data fields 404 can be located between two servo data fields 402.

Figure 5:
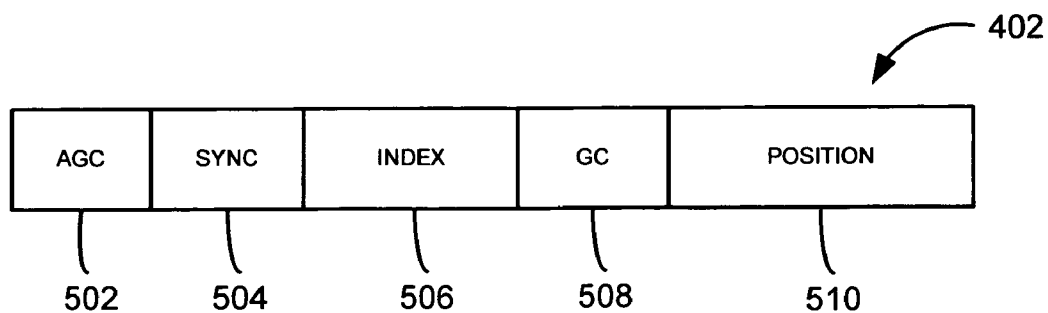
FIG. 5 is general diagram of an illustrative embodiment of a servo data field of a data track.

FIG. 5 provides a representation of the general format of each of the servo data fields 402. An automatic gain control (AGC) field 502 stores an oscillating pattern (such as a 2T pattern) to prepare the servo control 228 for receipt of remaining portions of the servo data field 402. A synchronization (sync) field 504 provides timing information to the servo control 228. Index and Gray code (GC) fields 506 and 508 respectively, indicate angular and radial position of the servo field 402. A position field 510 provides inter-track positioning information.

Figure 6:
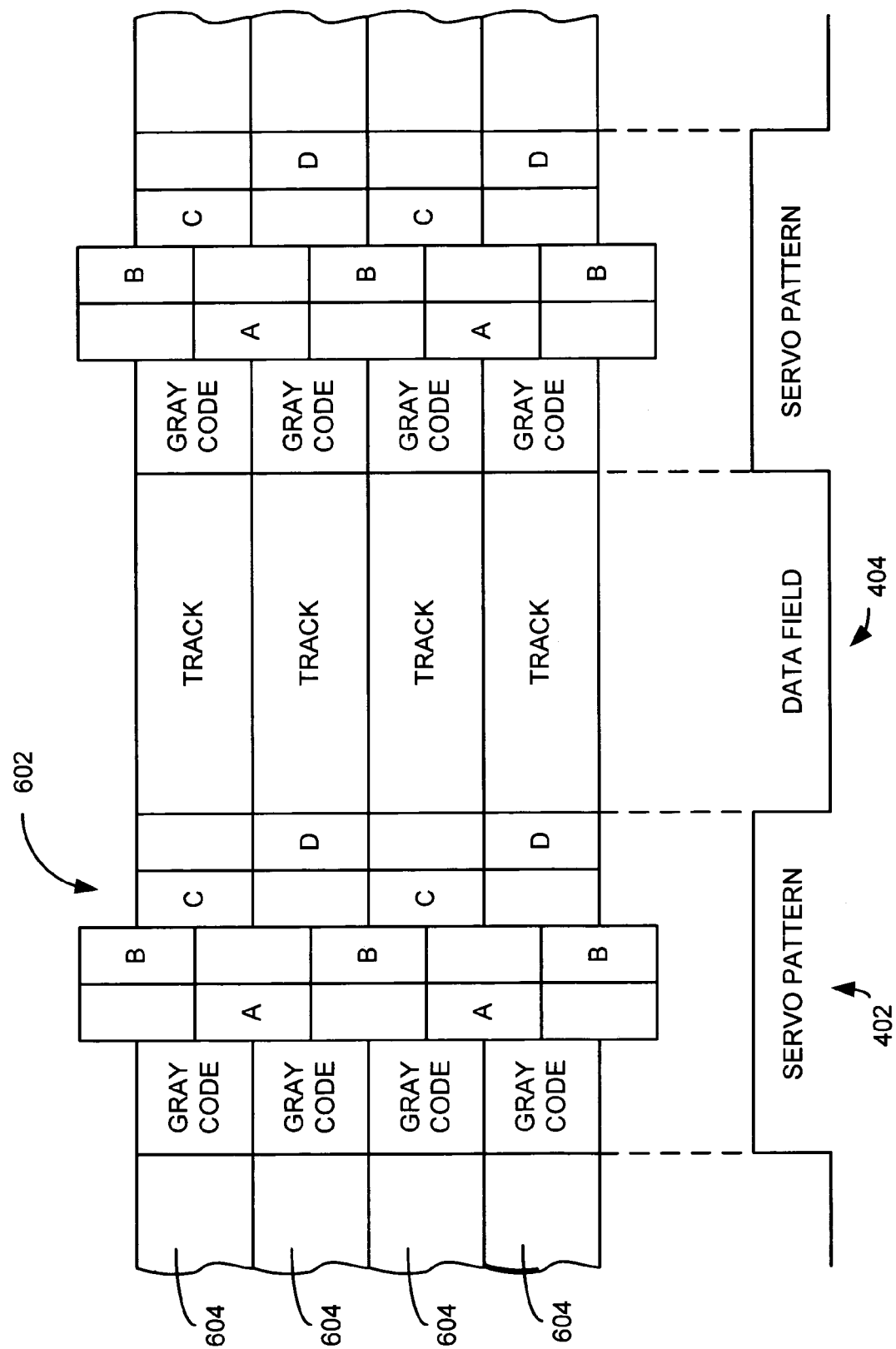
FIG. 6 is general diagram of an illustrative embodiment of servo patterns and data fields on a data storage device.

As shown particularly in FIG. 6, servo data field 402 includes a gray code and servo burst patterns A, B, C and D. The gray code, for example, may include address and track marks, automatic gain control codes, clock recovery patterns, etc. The gray code and A, B, C and D servo burst patterns are used for track positioning. The A, B, C and D servo burst patterns are positioned at track center and half-track positions. Thus, gray codes C and D are illustrated as centered on alternate tracks and servo burst patterns A and B are centered on alternate half tracks. The servo codes illustrated in FIG. 6 are written during a servo pattern write operation. As shown in FIG. 6, servo bursts A, B, C and D are written in a offset fashion such that servo bursts C and D are coincident with successive tracks 604 and servo bursts A and B are offset by one half track. The A, B, C and D servo burst patterns are used for positioning the head 118 over a data field 404.

Figure 7:
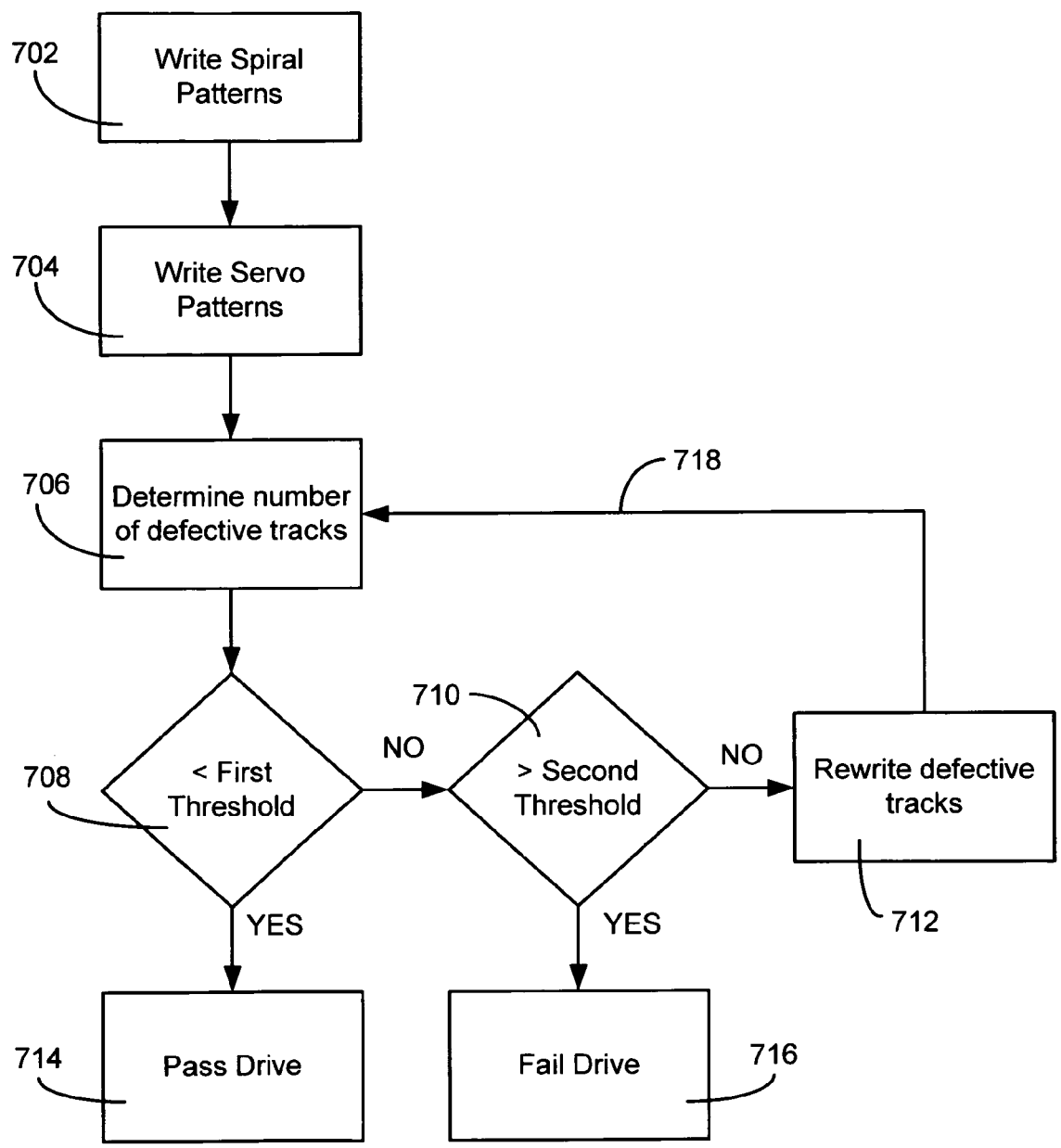
FIG. 7 is a flow diagram of an illustrative embodiment of a method for rewriting data tracks.

Referring to FIG. 7, a particular embodiment of a method of rewriting defective tracks is illustrated. Spiral patterns are written to one or more disc surfaces, at 702. Position and timing information is read from the spiral patterns in order to write servo patterns, at 704. The spiral patterns may be left intact except for the collisions between the servo patterns and the spiral patterns. In other embodiments, any method of writing servo patterns can be used.

Next, a number of defective tracks is determined by a flaw scan pass of the disc surfaces, at 706. The flaw scan process can test for undesired characteristics, such as unacceptable run-out, unacceptable fly-height, defective servo patterns, and repeatable anomalies. If the number of defective tracks is less than a first threshold, such as a maximum allowable number of defective tracks, at 708, then the disc drive is passed, at 714. If the number of defective tracks is greater than a second threshold, such as a maximum number of recoverable defective tracks, at 710, the disc drive is failed, at 716.

If the number of defective tracks is less than the second threshold, at 710, the defective tracks are then rewritten, at 712. A defective track may be only on one surface or on several surfaces. To repair defective tracks, each surface can be individually repaired. The process starting with the determining the number of defective tracks can then be repeated, at 718.

Rewriting the defective tracks can recover some of the yield loss resulting from a defective track being removed from a usable list of good tracks. The yield loss due to defective tracks can be beneficially recovered without a significant cost increase. Also, the number of spare tracks can be reduced, thereby increasing the format efficiency.

Figure 8:
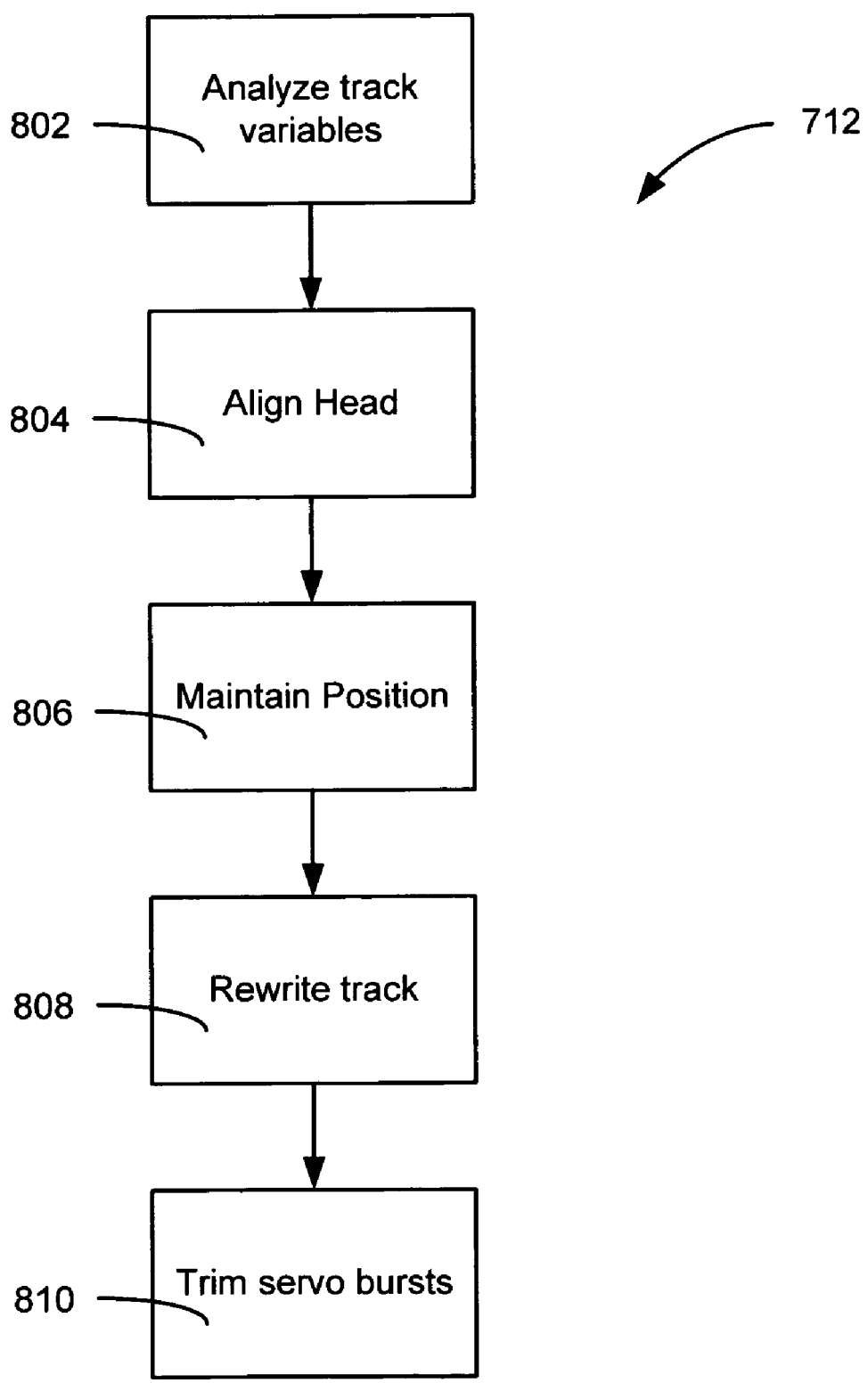
FIG. 8 is a flow diagram of a second particular embodiment of a method for rewriting data tracks.

Referring to FIG. 8, a particular embodiment of a method of rewriting defective tracks is illustrated. To rewrite a defective track, track characteristics such as track run-out are analyzed and corrected, at 802. After the characteristics are corrected, the track can be rewritten.

While the track is being rewritten, the write head maintains its position while the writer is turned on to write specific servo bursts. In one embodiment, the write head is aligned, at 804. This can be done by deriving timing and position information from previously written servo patterns. The repair can start on the adjacent track or a last known good track. The write head is moved to align with the correct servo burst so that the edge of the head aligns with the edge of the burst. The write head maintains the correct offset position, at 806, while the defective track is being rewritten.

Normally, the read head reads the servo information on the track to maintain its position, but in a particular embodiment, the reader will be turned off for each servo pattern that is to be rewritten, at 806. In a particular embodiment, in order to avoid turning the reader off for multiple consecutive samples, the servo bursts are rewritten by using multiple revolutions of the disc and by turning off the reader for some of the servo patterns in order to write each of the defective servo patterns. A reduction of non-repeatable-run-out (NRRO) is realized from multiple pass writes. Thus, by writing the bursts in multiple passes, the NRRO can be averaged for multiple revolutions and the quality of the rewritten track will be improved.

After the write head is aligned and the reader is turned off, the defective track is rewritten, at 808. When the defective track is rewritten, the correct gray code track identification is written in the gray code field. Timing information is obtained from a preamble field. A phase locked loop can be used to synchronize the timing of the servo pattern to match the adjacent tracks. The AGC, grey code, and servo bursts can be individually rewritten or the whole servo pattern can be rewritten together.

After the track has been rewritten, another write pass is executed to trim the servo bursts, at 810. Normally, when servo bursts are written, they are trimmed to be a specific width. Since a rewritten burst may have full width bursts, a trim pass occurs to make them the standard width. In a particular embodiment, the final servo burst written has full width bursts and are trimmed to standard width during a trim pass.

The systems and methods described herein can repair defective tracks that have repairable characteristics. The systems and methods can repair any of the servo pattern fields, including the servo bursts, the gray code field, and the AGC field. The systems and methods described herein are also able to repair tracks written with faults incurred that are temporary and where rewriting has a probability of correcting the problem. For example, some correctable problems include external vibration, high fly height writes, and other temporary head disturbances.

The systems and methods described herein provide cost savings and additional benefits. For example, repairing defective tracks can lead to less drives being failed during the manufacturing process. In addition, the number of reserved spare tracks can be reduced allowing the useable capacity of the drive to be increased or the overall tracks-per-inch (TPI) and bits-per-inch (BPI) could be reduced.

The methods described herein are described with reference to a disc drive during the manufacturing process. However, the disclosed techniques can also be used to rewrite defective tracks in the field. Spiral pattern writing techniques can be used to write a portion of each drive in the factory and then finish writing the drives in the field when the described methods can be performed.

The scan for defective tracks can also be done before the spiral patterns are erased. This makes the repair effort easier since the timing position information is a already present in the spiral patterns. Also, the spiral patterns are already positioned in a way so the drive can read position information and still write the servo pattern information. In a particular embodiment, the spiral patterns are written on all the surfaces; this makes rewriting easier. However, having spiral patterns written on all the surfaces is not required.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   writing a servo pattern on a data storage surface having tracks;
   determining a number of defective tracks on the data storage surface;
   comparing the number of defective tracks to a first threshold and a second threshold,
      wherein the first threshold is less than the second threshold;
   rewriting the servo pattern information on a defective track when the number of defective tracks is greater than the first threshold and less than the second threshold; and
   failing a test and not rewriting the servo pattern information on the defective track when the number of defective tracks is greater than the second threshold.

2. The method of claim 1, wherein the second threshold is a maximum number of recoverable defective tracks.

3. The method of claim 1, further comprising:
   passing the test and not rewriting the servo pattern on the defective track when the number of defective tracks is less than the first threshold.

4. The method of claim 3, wherein the first threshold is a maximum number of allowable defective tracks.

5. The method of claim 1, wherein rewriting the servo pattern further comprises writing one of an automatic gain control field, a gray code field, and servo bursts.

6. The method of claim 1, wherein rewriting the servo pattern further comprises writing an automatic gain control field, a gray code field, and servo bursts.

7. The method of claim 6, further comprising rotating the data storage surface to rewrite the information on the defective track.

8. The method of claim 7, further comprising rotating the data storage surface at least once to rewrite the defective track.

9. The method of claim 1, further comprising:
   detecting a defective track by analyzing a track characteristic.

10. The method of claim 9, wherein the track characteristic is run-out.

11. The method of claim 1, further comprising:
    maintaining track position while writing the defective track.

12. The method of claim 8, further comprising:
    trimming the servo bursts to a specific width.

13. A device, comprising:
    a data storage surface having at least one data track with a servo pattern;
    a head for writing data on the at least one data track; and
    a controller adapted to:
       determine a number of defective data tracks on the data storage surface;
       compare the number of defective data tracks to a first threshold and a second threshold, wherein the first threshold is less than the second threshold;
       rewrite the servo pattern on at least one defective data track when the number of defective tracks is greater than the first threshold and less than the second threshold; and
    fail a test and not rewrite the servo pattern information on the defective track when the number of defective tracks is greater than the second threshold.

14. The device of claim 13, wherein the servo pattern comprises one of an automatic gain control field, a gray code field, and servo bursts.

15. The device of claim 14, further comprising:
    a spindle motor for rotating the data storage surface;
    an actuator arm for holding the head and moving the head over the data storage surface; and
    servo control for positioning the head over the defective data track;
    wherein the head comprises a read element and a write element.

16. The device of claim 15, wherein the controller is further adapted to:
    detect a defective track by analyzing run-out of a track;
    determine a number of defective tracks;
    determine a test fails when the number of defective tracks is greater than a threshold;
    rotate the data storage surface to rewrite the servo pattern on the defective track;
    turn off the read element while the defective track is being rewritten; and
    trim rewritten servo bursts to a specific width.

17. A test system, comprising:
    a writer for writing servo patterns on data tracks of a data storage surface; and
    a controller adapted to:
       detect a number of defective tracks;
       determine a test failure when the number of defective tracks is greater than a threshold; and
       rewrite a servo pattern on a defective track when the number of defective tracks is less than the threshold.

* * * * *